United States Patent
Hocanin et al.

(10) Patent No.: US 11,803,650 B1
(45) Date of Patent: Oct. 31, 2023

(54) COLUMN ACCESS CONTROL (71) Applicant: Amazon Technologies, Inc., Seattle, WA (US)

(72) Inventors: Turkay Mert Hocanin, White Plains, NY (US); Anthony A. Virtuoso, Hawthorne, NJ (US)

(73) Assignee: Amazon Technologies, Inc., Seattle, WA (US)

(*) Notice: Subject to any disclaimer, the term of this patent is extended or adjusted under 35 U.S.C. 154(b) by 8 days.

(21) Appl. No.: 16/042,948

(22) Filed: Jul. 23, 2018

(51) Int. Cl.
G06F 21/62 (2013.01)
G06F 16/13 (2019.01)
G06F 16/22 (2019.01)
G06F 16/2455 (2019.01)
G06F 21/60 (2013.01)

(52) U.S. Cl.
CPC ............ *G06F 21/62* (2013.01); *G06F 16/13* (2019.01); *G06F 16/221* (2019.01); *G06F 16/2282* (2019.01); *G06F 16/2455* (2019.01); *G06F 21/602* (2013.01)

(58) Field of Classification Search
CPC ..... G06F 21/62; G06F 21/602; G06F 16/2282; G06F 16/221; G06F 16/13; G06F 16/2455
See application file for complete search history.

(56) References Cited

U.S. PATENT DOCUMENTS

| | | | |
|---|---|---|---|
| 9,749,132 B1 | 8/2017 | Hamilton | |
| 9,792,454 B2* | 10/2017 | Rozenberg et al. | G06F 21/6218 |
| 10,044,693 B1* | 8/2018 | Chudhary et al. | H04L 63/0435 |
| 2008/0317242 A1* | 12/2008 | Bohush et al. | H04L 9/16 380/28 |
| 2010/0250958 A1* | 9/2010 | Browning | G06F 21/602 713/189 |
| 2014/0075571 A1* | 3/2014 | Jackson et al. | G06F 21/6227 726/28 |
| 2015/0178506 A1* | 6/2015 | Elovici et al. | G06F 21/602 713/189 |
| 2015/0371058 A1 | 12/2015 | Mattsson | |

(Continued)

OTHER PUBLICATIONS

"How to encrypt/decrypt selected cells in Excel?" Article dated Jan. 19, 2016 as verified by the Internet Archive (5 pages) http://web.archive.org/web/20160119090054/https://www.extendoffice.com/documents/excel/3435-excel-encrypt-cell-contents.html (Year: 2016).*

Jackie Sabbagh. "Encrypt/Decrypt Sensitive Data in Excel Spreadsheets Using CellShield" Article dated Jun. 15, 2017 as verified by the Internet Archive (7 pages) http://web.archive.org/web/20170615204730/https://www.iri.com/blog/data-protection/encryptdecrypt-sensitive-data-excel-spreadsheets-cellshield/ (Year: 2017).*

Leist, "An Introductory SOL Tutorial: How to Write Simple Queries", HubSpot, Mar. 25, 2015, https://web.archive.org/web/20151127033248/https://blog.hubspot.com/marketing/sql-tutorial-introduction, 17 pages.

(Continued)

Primary Examiner — Joseph P Hirl
Assistant Examiner — Thomas A Gyorfi
(74) Attorney, Agent, or Firm — Davis Wright Tremaine LLP (57) ABSTRACT A database management system receives a request to process a database query on behalf of a security principal. The database management system determines that processing the database query requires access to an encrypted portion of a file containing data subject to access conditions. The database management system determines that the security principle is authorized to use a key that corresponds to the encrypted portion of the file. The database management system then completes processing of the query by using the key to access the encrypted portion of the file.

20 Claims, 8 Drawing Sheets (56) References Cited

U.S. PATENT DOCUMENTS

| | | | |
|---|---|---|---|
| 2015/0379299 A1* | 12/2015 | Klein et al. | G06F 21/6227 |
| | | | 713/193 |
| 2016/0210470 A1* | 7/2016 | Rozenberg et al. | G06F 21/6218 |
| 2016/0292221 A1* | 10/2016 | Clarke et al. | G06F 16/24537 |
| 2016/0344707 A1 | 11/2016 | Philipp | |
| 2017/0063811 A1 | 3/2017 | Hitchcock et al. | |
| 2017/0262645 A1* | 9/2017 | Gupta et al. | G06F 21/6218 |
| 2018/0012031 A1* | 1/2018 | Block et al. | G06F 21/6218 |
| 2018/0365290 A1* | 12/2018 | Kaushik et al. | G06F 21/602 |
| 2019/0220619 A1* | 7/2019 | Loza et al. | G06F 16/2456 |

OTHER PUBLICATIONS

Oracle Help Center. "Database Concepts: 11 Physical Storage Structures" (C)1993, 2015 Oracle Corp. (18 pages) https://docs.oracle.com/cd/E11882_01/server.112/e40540/physical.htm#CNCPT003 (Year: 2015).*

Stack Overflow article "How do databases physically store data on a filesystem?" Article dated May 17, 2013 as witnessed by the Internet Archive (2 pages) http://web.archive.org/web/20130517052309/https://stackoverflow.com/questions/12018565/how-do-databases-physically-store-data-on-a-filesystem (Year: 2013).*

Stack Overflow article "How do databases physically store data on a filesystem?" Comments from Aug. 18-19, 2012 (2 pages) https://stackoverflow.com/questions/12018565/how-do-databases-physically-store-data-on-a-filesystem (Year: 2012).*

\* cited by examiner

COLUMN ACCESS CONTROL

BACKGROUND

It has become increasingly common for database management systems to store and retrieve data on behalf of multiple tenants. Such database management systems, sometimes referred to as multi-tenant databases, face a variety of challenges related to providing database security. These challenges include controlling access to data at the table, column, and row levels, not only with respect to the users associated with a particular tenant, but also with respect to users associated with other tenants. A database management system may also be called upon to control access to data in situations where data owned by multiple users and tenants is stored within a single database table or column.

BRIEF DESCRIPTION OF THE DRAWINGS

Various techniques will be described with reference to the drawings, in which.

DETAILED DESCRIPTION

Embodiments of the disclosure are directed to controlling access to data stored by a database management system. In an embodiment, a database management system receives a request to process a database query on behalf of a security principal. The database management system determines that in order to process the database query, it will require access to an encrypted portion of a file containing data subject to restricted-access conditions, such as a column of data that can only be accessed by certain users. The database management system determines that the user is authorized to use a key that corresponds to and can be used to access the encrypted portion of the file. The query is then processed by the database management system using data from the encrypted portion that was accessed using the key.

In an embodiment, the database management system stores information indicative of a mapping between the security principal and a plurality of cryptographic keys. The mapping, in an embodiment, is based at least in part on the portions of a database table, or other database object, that the security principal is authorized to access.

In an embodiment, the database management system determines that the encrypted portion of the file can be decrypted using one of the keys to which the security principal is mapped. By separately encrypting each portion of data based on the users or tenants are authorized to access the portion, the database management system can track authorization based on access to a corresponding key. If a security principal is mapped to a key, and that key is useable to decrypt a portion of data, the database management system can conclude that the security principal is authorized to access the data.

In an embodiment, the database management system generates a query plan to comprise one or more operations to decrypt the encrypted portion of the file. The database management system may also, in an embodiment, generate query plans based at least in part on considerations of the cost of decryption. For example, the database management system may change the order of scan, seek, or merge operations in view of the cost of decrypting a restricted-access portion of data.

In an embodiment, the database management system maintains unencrypted portions of data files, where these portions may comprise information indicative of the data contained in the encrypted portion. In some instances, these unencrypted portions comprise table and column-level metadata.

In an embodiment, the database management system stores metadata indicative of the portions of a database table that are encrypted. For example, a database management system may, in an embodiment, maintain metadata indicating which columns of a table are restricted and which keys are required for decryption.

In an embodiment, the database management system stores a file corresponding to and comprising the data for a column of data. The file may comprise a plurality of separately encrypted portions, where each portion corresponds to a subset of the column. Access to each subset of the column can thereby be independently controlled.

In an embodiment, the database management system stores a file corresponding to and comprising the data for a database table. The file can be subdivided into portions, where each portion corresponds to a column of the table, and where each portion can be separately encrypted and controlled.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
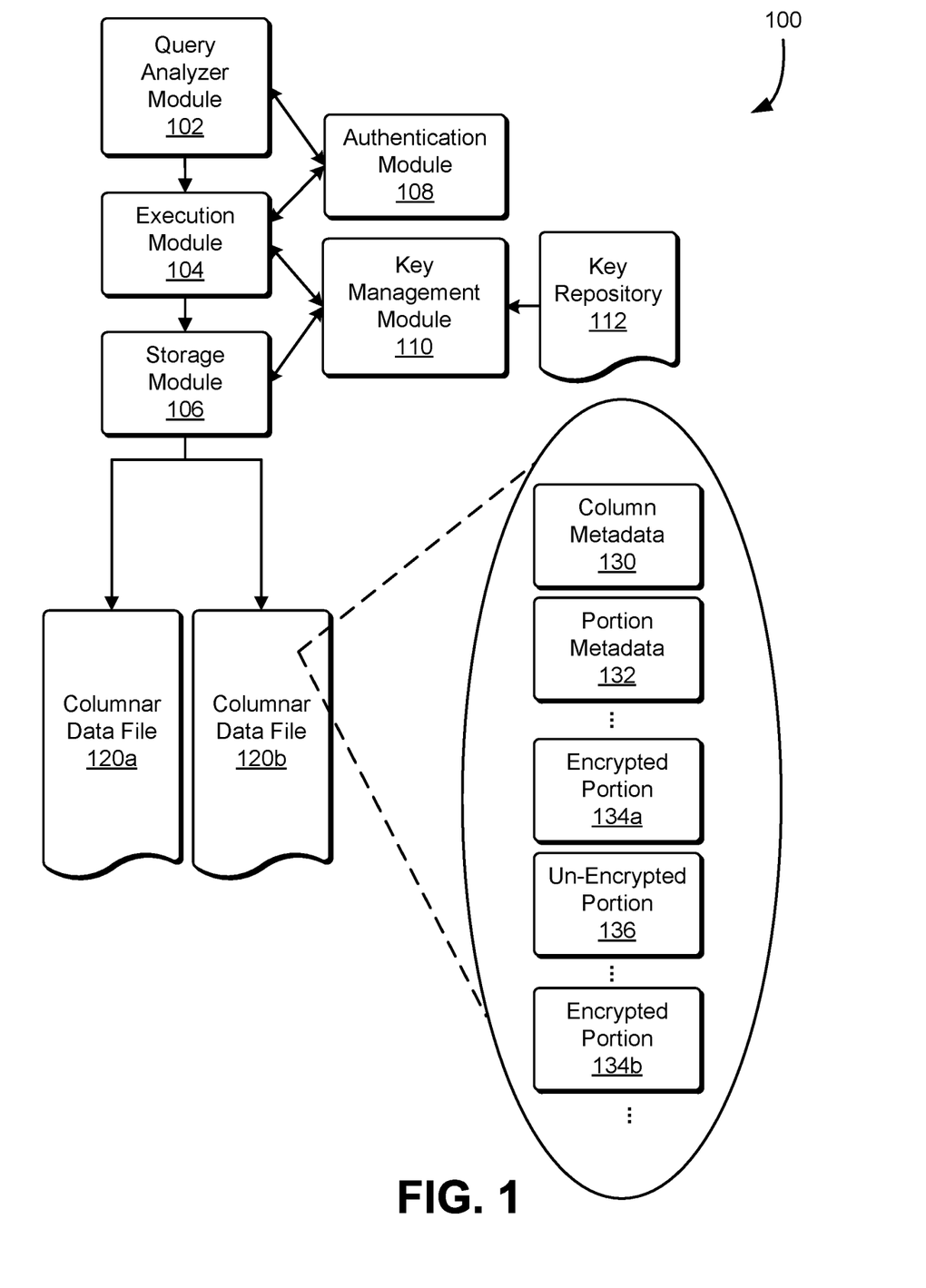
FIG. 1 illustrates an example database management system, in accordance with an embodiment.

FIG. 1 illustrates an example database management system, in accordance with an embodiment. Examples of database management systems include, but are not limited to, relational database management systems, key-value database management systems, NoSQL database management systems, object databases, and document management systems. In FIG. 1, the example embodiment of a database management system 100 performs data storage and retrieval operations. The database management system 100 comprises various modules which are executed on a computing system, such as the application servers described herein. A module, as used herein, comprises a set of computer-executable instructions, at least some of which are loaded into the memory of a computing system and executed by one or more processors of the computing system. The instructions, in response to being executed by the processors, cause the computing system to perform the operations associated with the module. In various embodiments, the described modules may be combined in various ways as sub-modules, or as modules whose functions overlap with, combine, or duplicate the functions performed by others of the described modules.

In an embodiment, a database management system comprises a computing device configured to execute the operations of a query analyzer module 102, an execution module 104, a storage module 106, an authentication module 108, and a key management module 110.

In an embodiment, the database management system 100 is a distributed database. A distributed database, in an embodiment, comprises multiple computing devices connected to each other via a network. These computing devices are sometimes referred to as nodes of the distributed database. In an embodiment, each node shares no physical components with the other nodes in the distributed database. In some cases and embodiments, some or all of the nodes each maintain a subset of a collection of data. These subsets are sometimes referred to as partitions. In some cases and embodiments, the partitions are replicated with other nodes in the system.

In an embodiment, each node of a distributed database operates as an independent database management system. For example, each node may be a computing device configured to execute the operations of a query analyzer module 102, an execution module 104, a storage module 106, an authentication module 108, and a key management module 110. Unless explicitly noted, the operations of these modules, as described herein, are the same whether executed on a node of a distributed database management system or on a computing device configured as a standalone database management system.

In an embodiment, the data of the depicted database management system 100 is organized as collections of data referred to as tables. A table refers to a logical structure for a collection of related data. Specifically, in an embodiment, each table comprises a set of columns and a set of rows containing values or "cells" corresponding to the columns.

In an embodiment, data for the database management system 100 is stored as a set of one or more files 120. In an embodiment, this data is stored on a non-transitory storage device, such as a solid-state drive or hard disk drive. In a distributed database, each node typically comprises storage devices which are not shared between any other nodes in the system.

In an embodiment, the database management system 100 stores table data as a set of columnar data files 120a. For example, a table $T_1$ might comprise columns $C_1$ and $C_2$. The data for column $C_1$ might be stored in a first columnar data file 120a, and data for column $C_2$ stored in a second columnar data file 120b. It should be appreciated, however, that various other data structures are contemplated and within the scope of the present disclosure. Examples of such structures include, but are not necessarily limited to, row-centric data structures for storing tabular data, and various formats for storing object-oriented data.

In an embodiment, each of the columnar data files 120 comprises data corresponding to a column of a table, such as the example table $T_1$. To illustrate, columnar data file 120a might contain the values $V_{r1c1}$, $V_{r2c1}$, ..., where $V_{r1c1}$ represents the value of column $C_1$ in the first row of the table $T_1$, $V_{r2c1}$ represents the value of column $C_2$ in the second row, and so on. Likewise, columnar data file 120b might contain the values $V_{r1c2}$, $V_{r2c2}$,..., where $V_{r1c2}$ represents the value of column $C_2$ in the first row of the table $T_1$, $V_{r2c2}$ represents the value of column $C_2$ in the second row, and so on.

In an embodiment, the columnar data files 120 each comprise a header or other section(s) storing column metadata 130. The column metadata 130 comprises, in an embodiment, data describing the data type of the column, the format in which the data is stored, the minimum and maximum values, or ranges, of the data contained in the column, and so on. It will be appreciate that these examples are intended to be illustrative, and as such should not be construed to limit the scope of the present disclosure to only those embodiments comprising the provided examples. The column metadata 130 may also, in an embodiment, comprise portion metadata 132. The portion metadata 132 is indicative of the various portions 134, 136 of data contained within the columnar data file 120b. This data describes, for example, where in the columnar data file each portion is located, and whether each of the respective portions is encrypted. For example, the portion metadata 132 can indicate that a portion 136 of the columnar data file 120b is unencrypted, and that other portions 134 are encrypted. The portion metadata 132 can further comprise data indicating which keys were used to perform the encryption of each of the encrypted portions 134.

In an embodiment, the columnar data files 120 each comprise a number of separately encrypted portions. For example, as depicted in FIG. 1, a columnar data file 120b comprises various encrypted portions 134. Here, separate encryption refers to using at least a distinct encryption key for each separately encrypted portion. For example, a first encrypted portion 134a is encrypted using a first key, and a second encrypted portion is separately encrypted using a second key. The first encrypted portion can therefore be decrypted using the first key but not the second key. Likewise, the second encrypted portion can be decrypted using the second encryption key but not the first key.

In an embodiment, data is included in each of the encrypted portions 134a,b based on entities authorized to access the data included in each portion. For example, in an embodiment, an encrypted portion, such as either of the encrypted portions 134a,b depicts in FIG. 1, comprises data an entity is authorized to access, and does not contain data the entity is not authorized to access. To illustrate, a first security principal $P_1$ might be authorized to access data in a first encrypted portion 134a, but not to access data in a second encrypted portion 134b. Likewise, a second security principal $P_2$ might be authorized to access data in the second encrypted portion 134b, but not authorized to access data in the first encrypted portion. As used herein, a security principal refers to a computer or application user, group, or account. A given security principal may be authorized to access some portions of data in a database tale, but not other portions. To further illustrate, consider a case in which the security principal P1 is authorized to access a first subset of the rows of a database table, and the security principal P2 is authorized to access a second subset of the rows. The first subset of rows can be stored in the first encrypted portion 134a, and the second subset of rows can be stored in the second encrypted portion 134b.

In an embodiment, the query analyzer module 102 receives a command to store or retrieve data stored by the database management system 100. The command may, for example, be expressed as structure query language ("SQL") command that was sent from a client device (not depicted in FIG. 1) to the database management system 100. The query analyzer module 102 then parses the command and develops a plan for executing it. This plan is sometimes referred to as a query plan or an execution plan. In an embodiment, the plan comprises a series of instructions, stored in memory, that describe a sequence of operations, branches, conditions, and so forth.

In an embodiment, an execution module 104 executes the instructions in the query plan, and then returns any results obtained from executing the instructions to the client device. The execution module 104 may interface with a storage module 106 to retrieve data necessary to process the command. Having obtained the data, the execution module 104 may then perform other operations needed to assemble a result to return to the client. These operations may include, for example, filtering data, joining data from different sources, ordering the data, and so on.

In an embodiment, the storage module 106 performs operations to store and retrieve the data needed to process the command. The storage module, in an embodiment, accesses files stored the system's storage device(s) and retrieves, from those files, the data needed to process a command to retrieve data. Likewise, when a command requests storing data, the storage module 106 accesses the files and stores the data within them.

In an embodiment the storage module 106 accesses the columnar data files 120 to store or retrieve data. In some cases, this may comprise an operation, sometimes referred to as a scan or an index scan, in which each row of a table is accessed. In other cases, storing or retrieving data may comprise operations in which are selected rows are accessed. These types of operations are sometimes referred to as seeks, or index seeks.

In an embodiment, the query analyzer module 102 formulates an execution plan based at least in part on the identity of a security principal on whose behalf the query is executing. As explained above, a security principal may be authorized to access only some portions of a table, but not others. The query analyzer module 102 may therefore formulate a plan that takes this into account.

In an embodiment, the query analyzer module 102 interfaces with the authentication module 108 to obtain or confirm the identity of the security principal on whose behalf the query is executing.

In an embodiment, the query analyzer 102 identifies portions of a table that can be accessed by the security principal. In an embodiment, the identification is based on a mapping between an identifier of the security principal and a set of encryption keys to which the security principal is authorized. This set may be compared to the encryption keys required to access whatever tables, columns, and portions of columns are to be accessed in order to process the query. The required encryption keys are determined, in an embodiment, using information stored in metadata. For example, the portion metadata 132 can indicate what encryption keys are required to decrypt a separately encryption portion 134*a* of a columnar data file 120*b*. Embodiments may employ similar approaches where data is encrypted at the table or column level.

In an embodiment, the query analyzer formulates the query plan to account for time spent decrypting the separately encrypted portions. For example, after identifying which portions of the data are separately encrypted, the query analyzer can incorporate the time and other resources that would be spent decrypting the data into cost estimates for the query plan.

Figure 2:
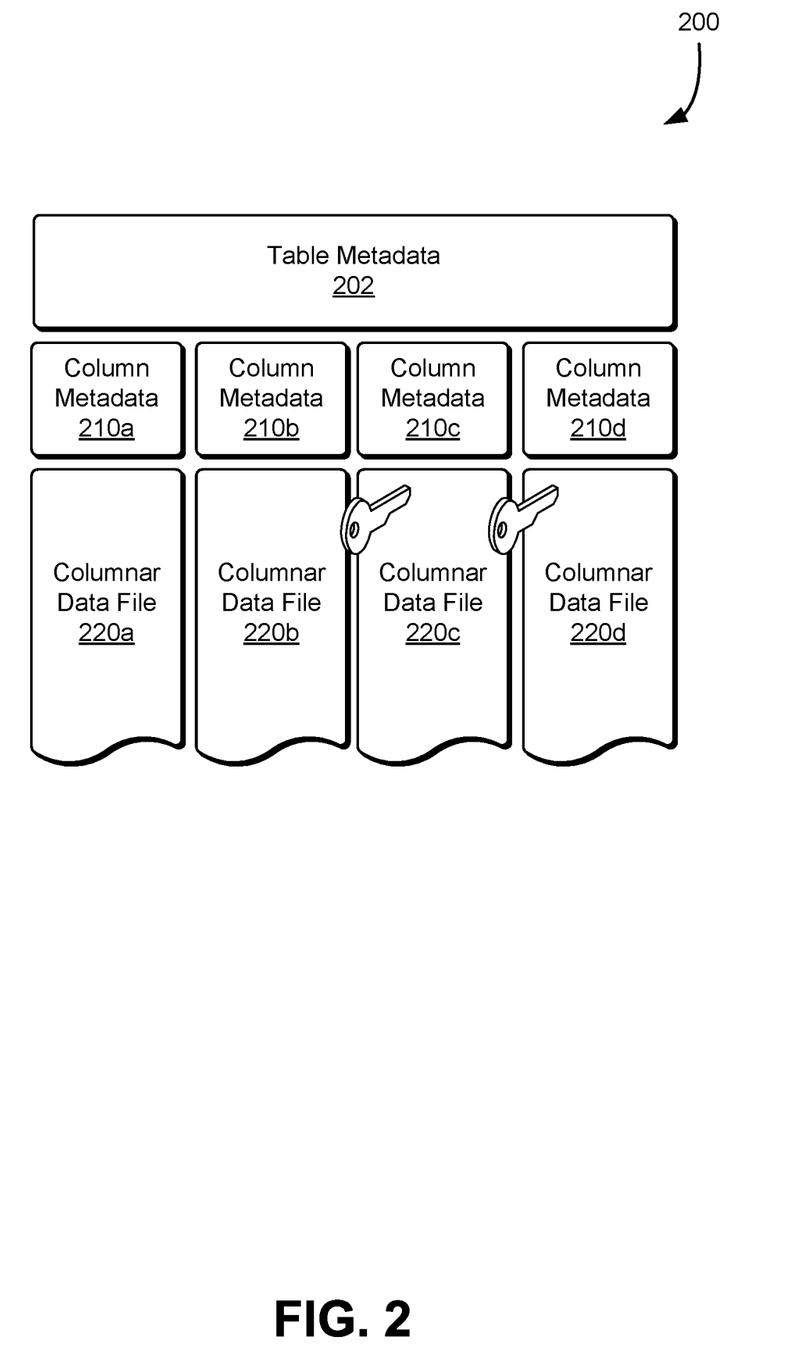
FIG. 2 illustrates a database management system with column-level encryption, in accordance with an embodiment.

In an embodiment, data is separately encrypted at the column level. FIG. 2 illustrates a database management system with column-level encryption, in accordance with an embodiment. In the example of FIG. 2, data for a database table 200 is stored in various portions, including table metadata 202, column metadata 210, and columnar data files 220.

In an embodiment, any of the columnar data files 220*a-d* may be separately encrypted. For example, one of the columnar data files 220*c* may be encrypted using a first encryption key, and another of the columnar data files 220*d* may be encrypted using a second key. Other columnar data files 220*a*,b may be left unencrypted.

In an embodiment, table metadata 202 comprises information about the table, such as its name and a listing of the columns that comprise it. Information about each column may, in some embodiments, be contained in separate locations. In other embodiments, information about each column may be stored with the table metadata 202. In these and other embodiments, each of the column metadata portions 210*a-d* comprises information about the respect columns, including information about the respective columnar data files 220*a-d*. This information can include an indication that the column is encrypted, and if so, information identifying the key needed to decrypt the corresponding columnar data file. For example, a column metadata portion 210*c* might indicate that the corresponding columnar data file 220*c* is encrypted, and further provide an identifier of or a link to an encryption key usable to decrypt the columnar data file 220*c*. Likewise, a column metadata portion 210*d* might indicate that the corresponding columnar data file 220*d* is encrypted and provide an identifier or link to an encryption key that could be used to decrypt the columnar data file 220*d*. The column metadata 210*a*,b for the columnar data files which were not encrypted can so indicate. No key is required to access the unencrypted columnar data files 220*a*,b.

Figure 3:
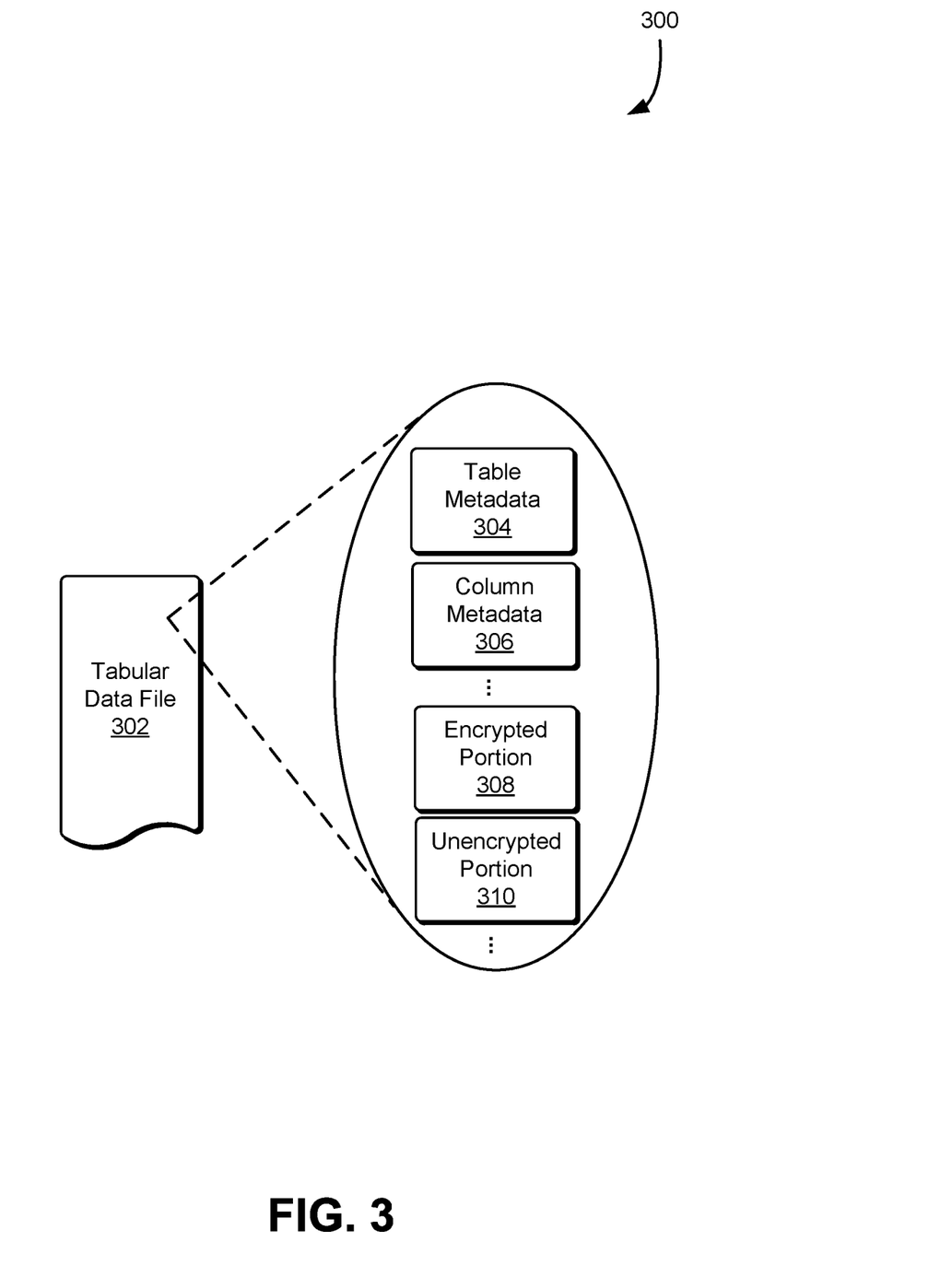
FIG. 3 illustrate a database management system storing tabular data, in accordance with an embodiment.

In an embodiment, data for a database table is stored within a single file. FIG. 3 illustrates a database management system storing tabular data, in accordance with an embodiment. In the example 300 of FIG. 3, a tabular data file 302 comprises individual portions, including table metadata 304, column metadata 306, encrypted portion 308, and unencrypted portion 310.

In an embodiment, the table metadata 304 corresponds to the table metadata 202 depicted in FIG. 2. The column metadata 306, likewise, corresponds to the column metadata 210*a*,b. The encrypted and unencrypted portions 308, 310 correspond to the encrypted and unencrypted portions 134, 136 of FIG. 1, or to the encrypted or unencrypted columnar data files 220*a-d*.

Figure 4:
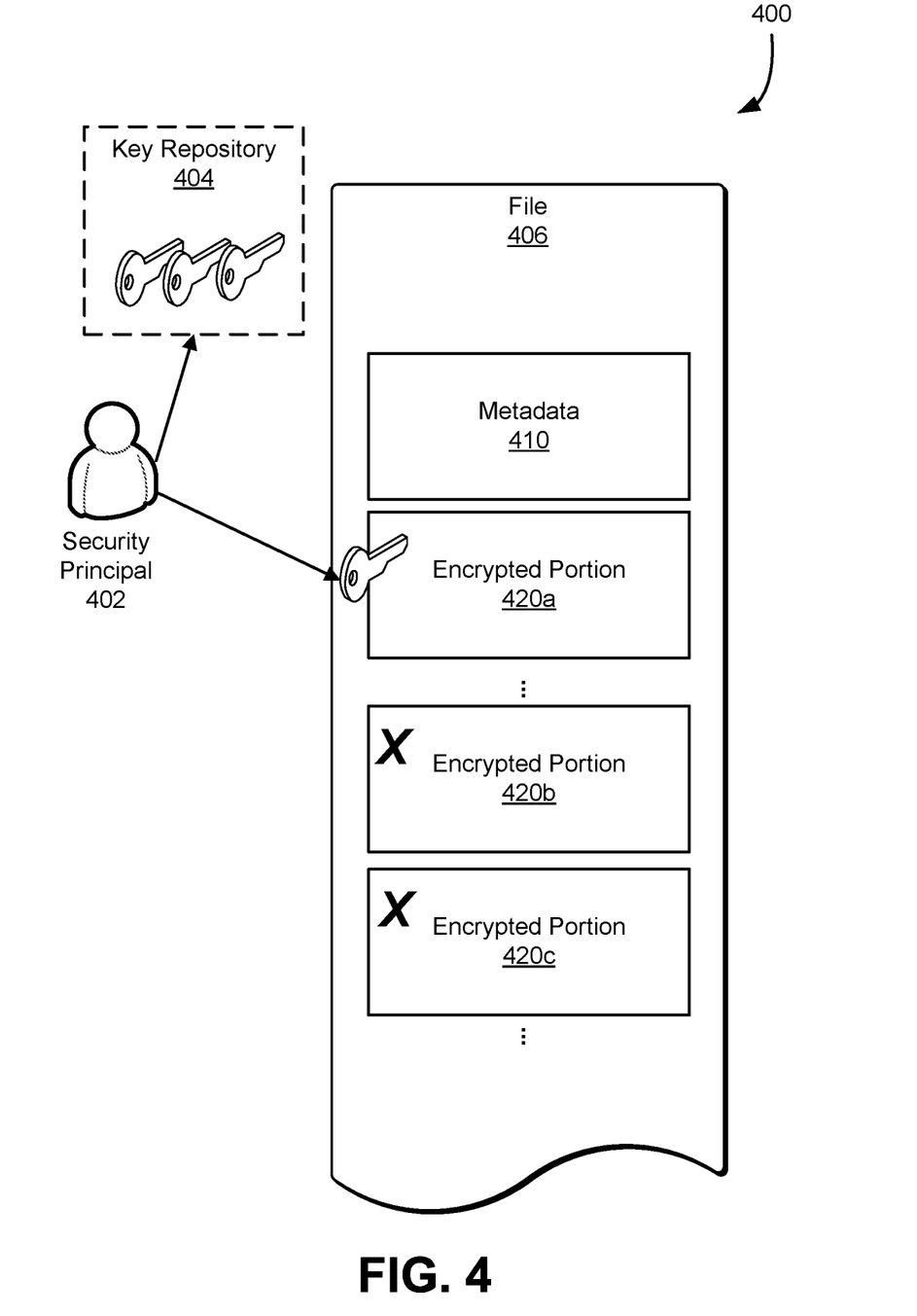
FIG. 4 illustrates decrypting separately encrypted portions of a database file, in accordance with an embodiment.

FIG. 4 illustrates decrypting separately encrypted portions of a database file, in accordance with an embodiment. In the example 400 of FIG. 4, a file 406 comprises an unencrypted metadata portion 410 and encrypted portions 420*a-c*. Each of the encrypted portions 420*a-c* are encrypted, in an embodiment, with a distinct key and can only be decrypted using either that key or a related key. For example, in an embodiment, the encrypted portion 420*a* is encrypted using a public key of a key pair, and can only be decrypted using the corresponding private key.

In an embodiment, the database management system 100 maintains a key repository 404. The key repository 404, in an embodiment, provides a mapping between a security principal 402 and a set of keys associated with the security principal 402.

In an embodiment, the keys are generated by the database management system 100 and stored in the key repository 404. The database management system 100, in an embodiment, stores further information in the key repository 404, the information mapping between the security principal 404 and the keys to which that principal has access.

In an embodiment, the database management system 100 stores information mapping the security principal 402 to a role (e.g. "user" or "administrator"), and information mapping the role to a set of keys.

In an embodiment, the database management system 100 stores a table mapping security principals to keys each respective security principal is authorized to access.

In an embodiment, the database management system 100 stores a first table mapping security principals to roles, and a second table mapping roles to keys each role is authorized to access.

In an embodiment, the database management system 100 stores a table comprising keys and key identifiers. Other tables, such as those mapping from security principals to authorized keys, comprise security principal identifiers and key identifiers.

In an embodiment, the key repository 404 is combined with other metadata stores maintained by the database management system. For example the database management system 100 may maintain a store of metadata describing various database objects, such as tables, columns, relationships, and security principals. The database management system 100 may also maintain the key repository 404 information in this store of metadata.

Figure 5:
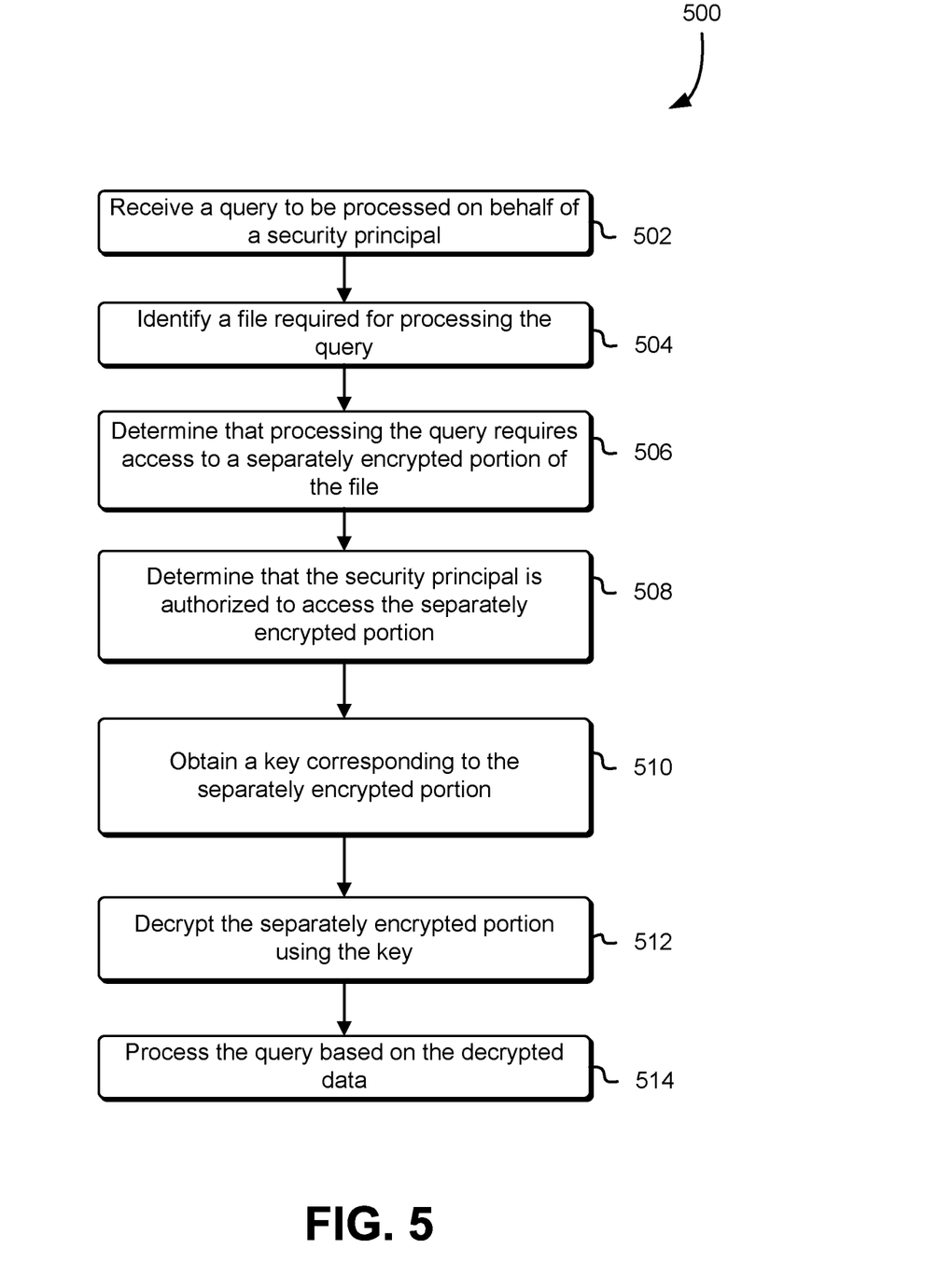
FIG. 5 illustrates an example procedure for processing a database query, in accordance with an embodiment.

FIG. 5 illustrates an example procedure for processing a database query, in accordance with an embodiment. Although FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel. The example process 500 may be performed by a database management system, such as the database management system 100 that FIG. 1 depicts.

At 502, in an embodiment, the database management system 100 receives a query to be processed on behalf of a security principal. The query may, for example, be transmitted from a client device on which an application is running in the context of a user account. Here, the security principal would correspond to the user. The query may comprise references to a database table, and may further require access to specific subsets of the data contained within the table. For example, a SQL query may reference a specific column in the SELECT clause and restrict access to a subset of the table's rows in the WHERE clause.

At 504, in an embodiment, the database management system 100 identifies a file required for processing the query. For example, the database management system may identify which columns are to be accessed in order to process the query, determine which subsets of those columns are needed, and identify the files in which the corresponding data is stored.

At 506, in an embodiment, the database management system 100 determines that processing the query requires access to a separately encrypted portion of the file. It may be the case that the entire file is encrypted, or that portions of the file are encrypted. In this step, in an embodiment, the database management system determines that a particular file and/or portions of the file are encrypted, and will require access to an appropriate key to decrypt.

At 508, in an embodiment, the database management system 100 determines that the security principal is authorized to access the separately encrypted portion. This may comprise, in an embodiment, determining that the security principal is authorized to use a key that corresponds to the decrypted portion.

At 510, in an embodiment, the database management system 100 obtains a key that corresponds to the separately encrypted portion. This may comprise, in an embodiment, retrieving the key from a secure repository (such as the key repository 112 of FIG. 1), once it has been confirmed that the security principal is authorized to use the required key.

At 512, in an embodiment, the database management system 100 decrypts the separately encrypted portion using the key. In some instances, less than the entire encrypted portion is decrypted.

At 514, in an embodiment, the database management system 100 completes processing of the query based, at least in part, on the decrypted data.

Figure 6:
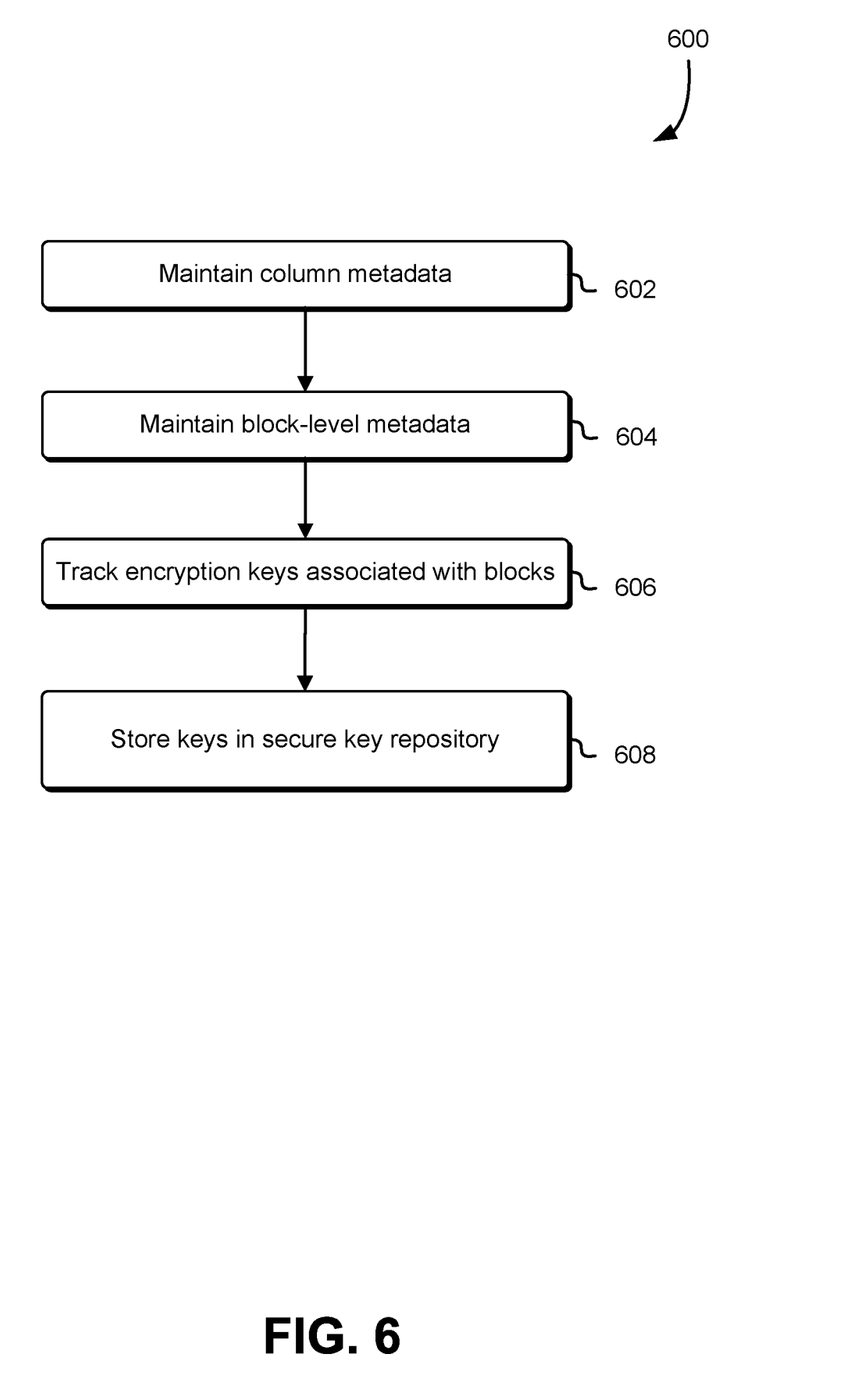
FIG. 6 illustrates an example procedure for maintaining encrypted database data, in accordance with an embodiment.

FIG. 6 illustrates an example procedure for maintaining encrypted database data, in accordance with an embodiment. Although FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel. The example process 600 may be performed by a database management system, such as the database management system 100 that FIG. 1 depicts.

At 602, in accordance with an embodiment, the database management system 100 maintains column metadata. This data comprises, in an embodiment, flags or other data indicating which columns are subject to access restrictions. Access restrictions can comprise the entire column being restricted and separately encrypted, or can comprise a portion of the column being restricted and separately encrypted.

At 604, in accordance with an embodiment, the database management system 100 maintains block-level metadata. This may be used when access to subsets of a column is restricted. The column data can be divided into blocks classified according to their access restrictions. For example, unrestricted portions of a column can be assigned to blocks that are not encrypted. For the restricted portions, the data can be divided according to who has access. For example, data accessible only to principal $P_1$ can be stored in blocks $B_{1a}$, $B_{1b}$..., and so on; and data accessible only to principal $P_2$ can be stored in blocks $B_{2a}$, $B_{2b}$, and so on.

At 606, in accordance with an embodiment, the database management system 100 tracks keys associated with the restricted columns and blocks. The database management system, in an embodiment, stores metadata indicating which files or subsets of files have been separately encrypted, and identifiers of the key(s) usable to access the encrypted portion.

At 608, in accordance with an embodiment, the database management system 100 stores the encryption keys in a secure key repository. In an embodiment, the database management system maintains a table which stores the keys, indexed by key identifier.

Figure 7:
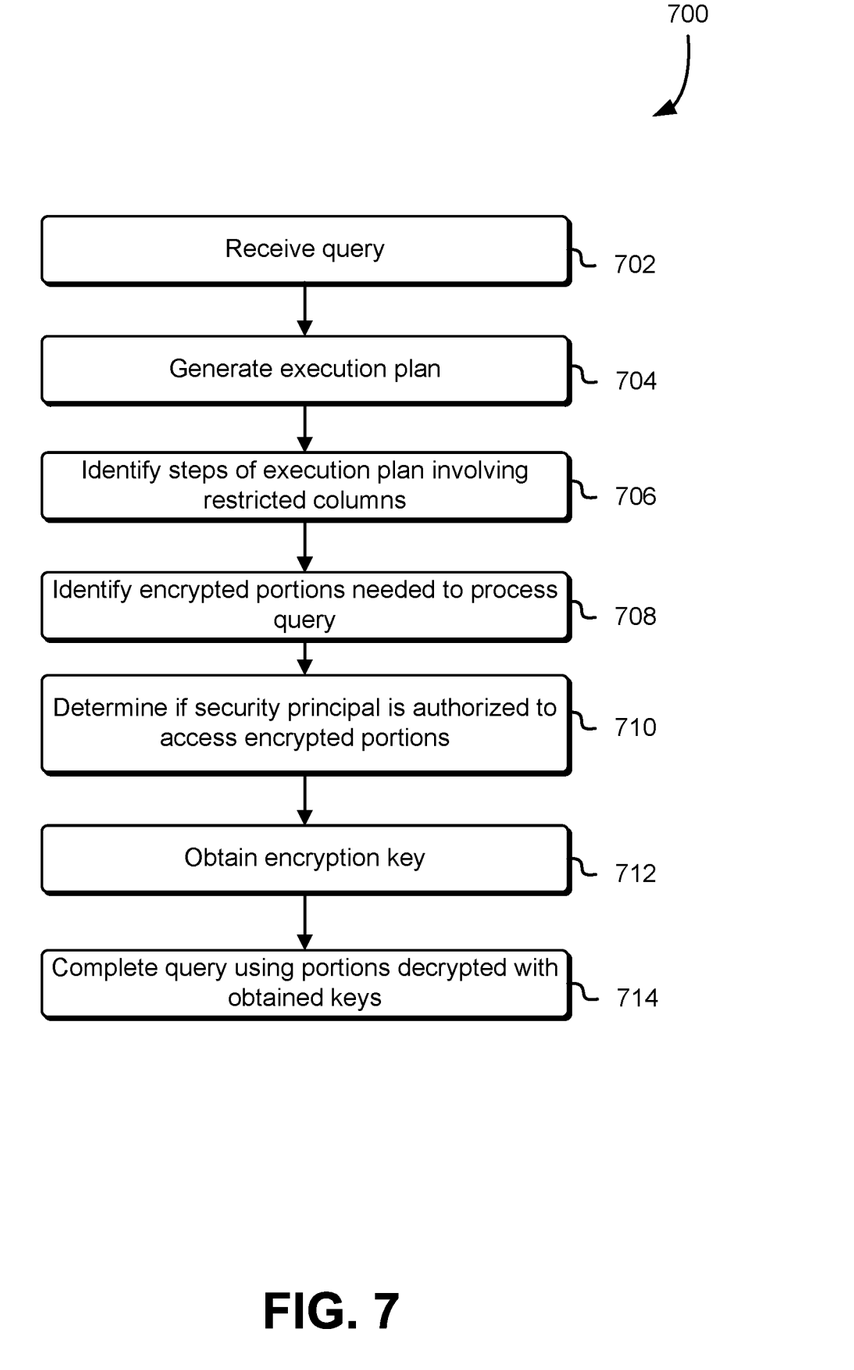
FIG. 7 illustrates an example process for executing a query plan, in accordance with an embodiment.

FIG. 7 illustrates an example process for executing a query plan, in accordance with an embodiment. Although FIG. 7 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel. The example process 700 may be performed by a database management system, such as the database management system 100 that FIG. 1 depicts.

At 702, in accordance with an embodiment, the database management system 100 receives a query. The database management system 100 also, in an embodiment, identifies a security principal associated with the query.

At 704, in accordance with an embodiment, the database management system 100 generates an execution plan. The execution plan refers to a set of instructions for processing the query. In an embodiment, the plan is generated by the database management system based on a cost-optimization process, in which the database attempts to identify a set of instructions that, when performed, will generally be considered efficient.

At 706, in accordance with an embodiment, the database management system 100 identifies steps of the execution plan that involve access to columns with restricted data. The database management system may, in an embodiment, evaluate the cost of these steps in view of the time and computational power required to access the restricted data. For example, the cost of decrypting the data may be evaluated and considered when formulating the plan. Since decryption is likely to be relatively expensive, embodiments may prefer to structure the plan so as to minimize the overall cost of performing the decryption. Thus, at 708, in accordance with an embodiment, the database management system 100 identifies encrypted data portions for which access is needed to process the query, and refines the query plan accordingly.

At 710, in accordance with an embodiment, the database management system 100 determines if the security principal is authorized to access those portions. This step may, in some cases and embodiments, be performed when the query is executed, rather than when the query plan is formulated.

At 712, in accordance with an embodiment, the database management system 100 obtains the keys needed to decrypt the identified encrypted portions. The database management system, in an embodiment, obtains the keys in response to determining that the security principal is authorized to use the keys.

At 714, in accordance with an embodiment, the database management system 100 completes processing of the query by accessing data decrypted using the obtained keys.

As one skilled in the art will appreciate in light of this disclosure, certain embodiments may be capable of achieving certain advantages, including some or all of the following. In some embodiments, security is improved with respect to multi-tenant databases, including instances where data from multiple tenants is stored within a database or table. In some embodiments, resistance to unauthorized access is improved. In some embodiments, performance is improved due to more selective application of encryption and decryption.

Figure 8:
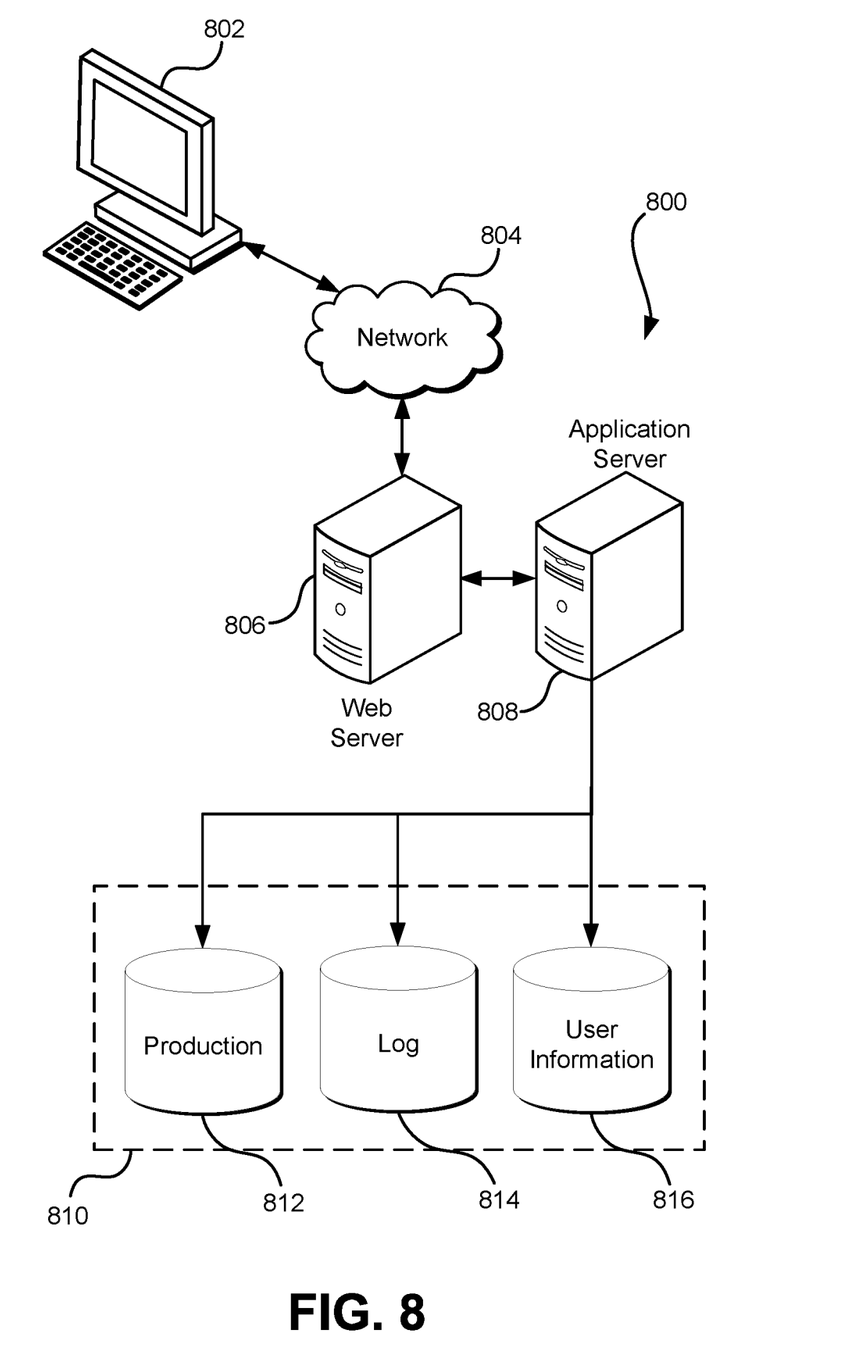
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets:

{A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors — for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    at least one processor; and
    at least one memory comprising instructions that, in response to being executed by the at least one processor, cause the system at least to:
        determine that execution of a database query on behalf of a security principal requires access to an encrypted portion of a plurality of encrypted portions of a columnar data file comprising data for a first column of a table, the encrypted portion encrypted with a first key and comprising data for a plurality of rows of the first column, the plurality of encrypted portions comprising at least one additional encrypted portion encrypted with an additional key and comprising rows of an additional plurality of rows of the first column, wherein the columnar data file includes an unencrypted portion comprising information indicative of data contained in the encrypted portion, wherein the information comprises one of at least an identifier or link to an encryption key used to decrypt a respective encrypted portion of the plurality of encrypted portions;
        determine, based at least in part on the information, that the first key is associated with the encrypted portion of the file;
        determine that the first key is one of a set of cryptographic keys the security principal is authorized to use; and
        process the database query based at least in part on accessing the encrypted portion of the file using the first key.

2. The system of claim 1, the at least one memory comprising further instructions that, in response to being executed by the at least one processor, cause the system at least to:
    store a mapping between an identifier of the security principal and an identifier of the key; and
    determine that the security principal is authorized to access the encrypted portion of the file based at least in part on the mapping.

3. The system of claim 1, the at least one memory comprising further instructions that, in response to being executed by the at least one processor, cause the system at least to:
    generate a query plan comprising one or more operations to decrypt the encrypted portion of the file, the query plan generated based, at least in part, on a cost of decrypting the encrypted portion.

4. The system of claim 1, wherein determining that execution of the database query on behalf of the security principle is based, at least in part, on metadata indicative of which portions of the file are encrypted.

5. A method, comprising:
determining that processing a database query on behalf of a security principal requires access to an encrypted portion of a columnar data file comprising data of a column of a plurality of columns of a database table, wherein the columnar data file comprises the encrypted portion and an additional encrypted portion, the encrypted portion encrypted with a key and comprising data of a plurality of rows of the column of the plurality of columns of the database table, the additional encrypted portion encrypted with an additional key and comprising data of an additional plurality of rows of the column, wherein the columnar data file comprises an unencrypted portion comprising data indicative of the encrypted portion;
identifying the key used to encrypt the encrypted portion of the file, based at least in part on the data indicative of the encrypted portion;
determining that a key corresponding to the encrypted portion of the file is one of a set of one or more keys the security principle is authorized to use; and
processing the database query based at least in part on accessing the encrypted portion of the file using the key.

6. The method of claim 5, further comprising storing information indicative of a mapping between the security principal and a plurality of keys.

7. The method of claim 6, wherein the mapping is based at least in part on portions of the database table the security principal is authorized to access.

8. The method of claim 6, further comprising determining that the encrypted portion of the file is decryptable using the key, wherein the key is one of the plurality of keys mapped to the security principal.

9. The method of claim 5, further comprising generating a query plan based, at least in part, on a cost of performing operations to decrypt the encrypted portion of the file.

10. The method of claim 5, wherein an unencrypted portion of the file comprises information indicative of data contained in the encrypted portion.

11. The method of claim 5, further comprising storing metadata indicative of columns of a database table that comprise encrypted data.

12. The method of claim 5, further comprising:
determining that execution of the database query on behalf of the security principle is based, at least in part, on metadata indicative of which portions of the file are encrypted.

13. The method of claim 5, wherein the unencrypted portion includes table and column-level metadata.

14. A non-transitory computer-readable storage medium having stored thereon executable instructions that, as a result of being executed by one or more processors of a computer system, cause the computer system to at least:
determine that processing a database query on behalf of a security principal requires access to an encrypted portion of a columnar data file comprising data of a column of a plurality of columns of a database table, wherein the columnar data file comprises the encrypted portion and an additional encrypted portion, wherein the encrypted portion of the columnar data file comprises data corresponding to a first subset of the column of a table, and the additional encrypted portion comprises data corresponding to an additional subset of the column of the table, wherein the columnar data file includes an unencrypted portion indicative of data in the encrypted portion;
identify, based at least in part on the unencrypted portion, a cryptographic key used to encrypt the encrypted portion of the file;
determine that the security principal is authorized to access the encrypted portion, the determination based, at least in part, on a determination that the cryptographic key is one of a set of one or more keys the security principle is authorized to use; and
process the database query based at least in part on accessing the encrypted portion of the file using the cryptographic key.

15. The non-transitory computer-readable storage medium of claim 14, wherein the instructions further comprise instructions that, as a result of being executed by the one or more processors, cause the computer system to:
store information mapping between the security principal and a set of cryptographic keys.

16. The non-transitory computer-readable storage medium of claim 15, wherein the security principal is mapped to portions of a database table the security principal is authorized to access.

17. The non-transitory computer-readable storage medium of claim 15, wherein the instructions further comprise instructions that, as a result of being executed by the one or more processors, cause the computer system to:
determine that the encrypted portion of the file is decryptable using one of the set of cryptographic keys.

18. The non-transitory computer-readable storage medium of claim 14, wherein the instructions further comprise instructions that, as a result of being executed by the one or more processors, cause the computer system to:
generate a query plan comprising one or more operations to decrypt the encrypted portion of the file.

19. The non-transitory computer-readable storage medium of claim 14, wherein an unencrypted portion of the file comprises information indicative of data contained in the encrypted portion.

20. The non-transitory computer-readable storage medium of claim 14, wherein the instructions further comprise instructions that, as a result of being executed by the one or more processors, cause the computer system to:
store metadata indicative of columns of a database table that comprise encrypted data.

\* \* \* \* \*